June 5, 1928.  1,672,481
DE WITT C. CONKLING
POWER BRAKE
Filed Nov. 22, 1924
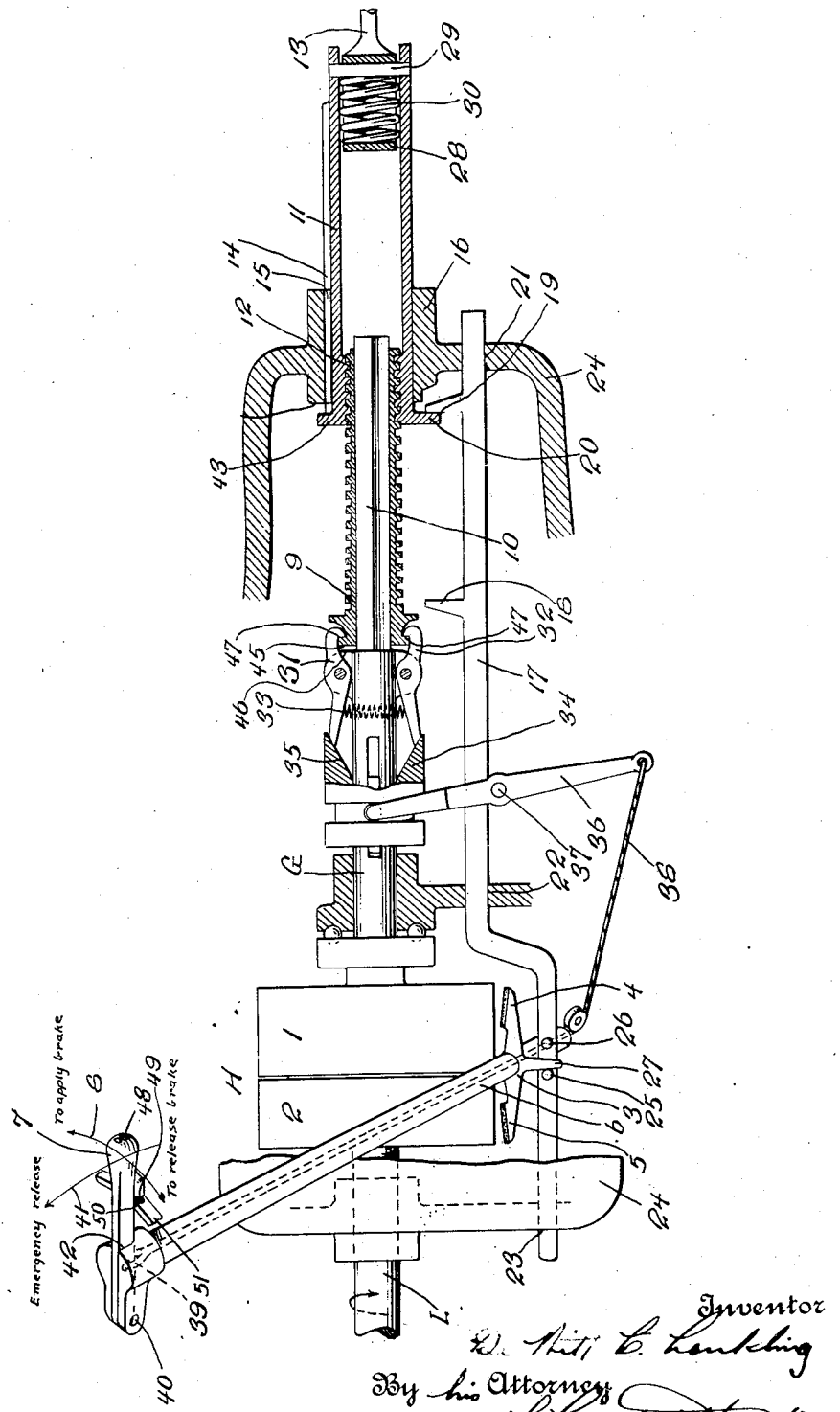

Patented June 5, 1928.

1,672,481

UNITED STATES PATENT OFFICE.

DE WITT C. CONKLING, OF JACKSON HEIGHTS, NEW YORK.

POWER BRAKE.

Application filed November 22, 1924. Serial No. 751,501.

This invention relates to a power brake mechanism adapted for use upon vehicles, or in any other connections as may be desirable.

An object of the invention is to provide a simple and efficient mechanical mechanism whereby to control application and release of brakes by means of power derived from a suitable power element or engine as for instance from the engine of an automobile or the like.

A further object is to provide a mechanism of the type indicated and to provide a simple, convenient and easily operable means of manually controlling the action thereof.

A further object is to provide a device as indicated and which will be adapted to serve as a lock for preventing operation of the part braked or for preventing theft of an automobile in cases where the device of this invention is applied as a brake mechanism upon such vehicles.

A more detailed object is to provide a device of the type indicated including suitable clutch controlled reversing gears, a shaft adapted to be rotated in either a forward or a reverse direction selectively through said gears by manipulation of a simple control lever and means operated by said shaft to either tighten or release the brakes according to the direction of rotation of the shaft, and also, to provide simple means for automatically controlling the limits of movement of the brake controlling parts, and also. to provide manually controlled means by which to effect release of the brakes at any time.

Other objects and aims of the invention, more or less specific than those referred to above, will be in part obvious and in part pointed out in the course of the following description of the elements, combinations, arrangements of parts and applications of principles constituting the invention. and the scope of protection contemplated will be indicated in the appended claims.

In the accompanying drawing which is to be taken as a part of this specification is shown a diagrammatic perspective view, partly in longitudinal section, of a brake mechanism constructed in accordance with this invention.

Referring to the drawing for describing in detail the exemplary structure therein shown the reference character L indicates a suitable power shaft. This may be connected to be driven in any suitable manner, either by an ordinary explosive engine, by an electric motor, or otherwise according to the requirements of the case.

While the brake mechanism comprising this invention is applicable to use in various connections an important use will be in association with an automobile or like vehicle structure as a means for controlling the application and release of the brakes upon the traction wheels of such vehicles. Its use in this connection will therefore be understood for the purposes of the present description, and in such use the shaft L may be driven by any suitable driving connection from the engine shaft of the automobile, or if preferred it may be driven by the generator accompanying the engine or by a separate electric or other motor. When connected to be driven from the engine shaft it will be driven only when the engine is operating whereas if connected to be driven by the generator. or. a separate motor it may be caused to rotate at any time by operating the generator or motor.

At G is connected what may be termed the brake shaft which is adapted to be driven by the shaft L, and connected between these shafts L and G is a suitable reversing gear device H comprising a pair of drums as 1 and 2 which will be hereinafter referred to as the brake tightening drum and the brake releasing drum respectively. The gear mechanism contained within these drums and connected with the two shafts is of a type already known and is therefore not shown or described herein, it being sufficient for the purpose of the present description to say that assuming the shaft L to be rotating in a direction as indicated by the arrow then if the drum 1 be held against rotation the shaft G will be caused to rotate in the same direction as the shaft L and cause the setting or tightening of the brakes, while if the drum 2 be held against rotation the shaft G will be caused to rotate in a direction reverse to the direction of rotation of shaft L and cause the release of the brakes.

Any suitable clutch device may be provided for selectively controlling the rotation of the drums 1 and 2 and for the purpose of illustration the drawing shows a double-ended lever as 3 pivotally mounted adjacent said drums having one of its ends as 4 arranged for engagement with the drum 1 and having its other end as 5 arranged for engagement with the drum 2. The lever is mounted intermediate its two ends upon a suitable shaft 6 which extends upwardly and carries at its upper end a handle 7 by which it may be oscillated back and forth as indicated by arrow 8 to the necessary extents for applying either the clutch 4 or 5 as desired. The shaft G has mounted thereon a longitudinal screw threaded sleeve 9 mounted to always rotate with said shaft. The shaft is preferably square as at 10 to receive this sleeve. Upon the sleeve 9 is a second or brake sleeve 11 having a threaded interior portion as 12 for engaging the threads of the screw sleeve.

To the outer end of the brake sleeve 11 is connected the brake rod 13.

The brake sleeve may be held against rotation by any suitable means but as illustrated is shown to be provided with a longitudinal groove 14 into which engages a feather 15 provided upon a bearing part as 16 within which the brake sleeve is supported.

It will be seen therefore that rotation of the shaft with drum 1 held stationary will cause the brake sleeve 11 to be drawn toward the left, in the drawing, while rotation of the shaft with the drum 2 held stationary will cause the sleeve 11 to be slid outwardly, that is toward the right in the drawing.

The action thus transmitted to the brake rod 13 by the selective movement of the handle 7 will thus be the same in effect as that now commonly given to the brake rod by the usual clumsy and unsightly brake lever in automobile construction. The movements will be positive and powerful which is of course of particular importance in the brake tightening direction, and it will be apparent that the movements in either direction may be carried to any extent between opposite limits as may be desired, the movement in either direction being immediately arrested by the simple act of returning the handle 7 to normal and thus leaving the two drums 1 and 2 instantly free to rotate without requiring rotation of the brake shaft G.

In order to automatically insure cessation of rotation of the shaft G when the brake sleeve 11 has reached either of its extremes a simple control mechanism is indicated which comprises a slide bar 17 extending parallel with the shaft G and having a pair of oppositely facing stops 18 and 19 thereon arranged to be engaged by an extension 20 of the brake sleeve as said sleeve approaches its opposite extremes. This slide bar may be mounted in suitable bearings as 21, 22 and 23 provided in a casing or housing part 24 which may envelope the entire mechanism if desired.

A pair of shoulder elements 25 and 26 are provided upon the rods spaced apart adjacent to the shaft 6 and adapted to receive between them an extending finger 27 connected with the lever 3.

When the brake sleeve 11 moves to the right into brake releasing position the extension 20 engages against the stop 19 and moves the slide bar to the position as indicated in the drawing that is with the shoulder element 25 engaging the finger 27 and holding the end 5 of lever 3 out of contact with the brake releasing drum as shown. If the operator then moves the handle 7 to cause the end 4 of lever 3 to engage the brake tightening drum 1, and for bringing the finger 27 against or nearly against the shoulder 26, this being the only way he could possibly move said handle, the brake sleeve will move toward the left until the extension 20 engages the stop 18 and moves the slide bar 17 to the left causing the lever 3 to be returned again to its normal position with the end 4 thereof out of engagement with the drum 1.

Engagement of finger 27 with shoulder 26 will make it impossible to again move the lever 3 into engagement with drum 1 until it has been first moved into engagement with drum 2 for sliding the sleeve 11 out of its extreme brake tightening position.

It will be seen therefore that the operator need only move the handle 7 into one position or the other as he may desire according to whether the brakes are to be set or released, and the mechanism described will perform the desired result and automatically go out of operation and return the handle 7 to normal when the result is accomplished.

The connection between the brake sleeve 11 and the brake rod 13 is preferably of a resilient character in order that the brakes may be applied with substantially maximum tightness without requiring a precise positioning of the brake sleeve. For this purpose the drawing illustrates the end of the brake rod as comprising a yoke 28 which straddles a cross pin 29 carried by the brake sleeve. A compression spring 30 is arranged within the end of the brake sleeve and between said yoke and said pin adapted to be compressed between the cross pin and the end wall of the yoke when the brake sleeve is moved to tightened position. It is intended that the brake rod itself will reach substantially maximum tightness before movement of the brake sleeve is arrested by the automatic cut off and that the further movement of the brake sleeve will be allowed by compression of the spring. In this way a desirable amount of flexibility is secured which will avoid the necessity for great accuracy in construction and yet insure uniformly efficient operation at all times.

In the instances where the brake mechanism of this invention is connected to be driven from the main engine shaft of an automobile it will occasionally happen that the engine will be idle and the brakes be in "on" position. In such a case it may not be desirable or convenient to start the engine, and on this account the present invention proposes a manual release for the brakes operable at any time. As illustrated this mechanism includes the making of the screw sleeve 9 as an element separate from the shaft instead of forming threads directly upon the shaft as would be otherwise possible, and of arranging said screw sleeve so that it may slide longitudinally of the shaft upon the square portion 10. It includes also suitable retaining means, such as the latches 31 and 32 spring-pressed by a spring as 33 for engaging the sleeve 9 to normally hold said sleeve against longitudinal movement. It includes also a means for releasing said latches as for instance the sliding collar 34 mounted upon the shaft and having a conical face portion 35 for engaging the latches to move them to releasing position when the collar is slid to the right along the shaft. A lever 36, pivotally supported in a suitable manner as at 37 engages said collar and is in turn arranged to be operated by suitable means extending to a position of accessibility for the driver of the vehicle. In the instance illustrated a cable as 38 is connected with the lever 36 and extends upwardly through a bore of the shaft 6 and into connection with the handle 7 as at 39. The handle 7 is pivotally mounted as at 40 upon the upper end of the shaft 6 so that it is adapted to swing in a direction longitudinally of said shaft as indicated by the arrow 41 whereby said cable may be drawn upon to operate the collar 34 by swinging the lever upwardly as suggested by said arrow 41 whenever desired.

Any suitable means, as for instance the spring 33, may be depended upon for returning all of these emergency operating parts to their normal positions.

The handle 7 normally rests within a transverse slot 42 at the upper end of the shaft 6 whereby it is adapted to swing upon the pivot 40 and yet be normally adapted to rotate said shaft upon occasion.

Whenever the latches 31 and 32 are released the screw sleeve 9, and the brake sleeve 11, the latter of course being at such time in braking position, will move immediately together into brake releasing position when the flange 43 which is provided at the inner end of the sleeve 11 engages against a limiting stop 44.

To restore the screw sleeve 9 again to normal position the shaft L must be rotating. The operator will move the handle 7 to brake releasing position. The finger 27 on lever 3 will move the slide bar 17 toward the left and the stop 19 on said slide bar will cause the two sleeves, and the brake rod 13 all to move to the left a correspondingly slight distance, this being possible because of the slackened condition of the brake rod 13 at this time. The sleeve 9 will begin to rotate in a direction tending to move the sleeve 11 again toward the right. Movement of sleeve 11 toward the right, being now obstructed by the stop 19 and pressure of the operator's hand on the handle 7, the screw 9 will travel toward the left and will continue so to travel until it is arrested by engagement of its end surface 45 with an opposing shoulder portion 46 provided upon its carrying shaft G in which position the latches 31 and 32 will again engage over the shoulders 47 of extension 20 and sleeve 11 will be forced against the stop 19 moving said stop and the shoulder element 25 also toward the left and returning the handle 7 to normal position thus releasing the brake drum 2 and allowing the parts to come to rest ready for subsequent application of the brakes by movement of the handle 7 to brake applying position whenever occasion may arise.

The only work required to be performed at any time by the operator is that of moving the handle 7 from one position to another for the purpose of "setting" the mechanism for proper action, the element of power being always supplied by the shaft L. The handle 7 may thus be properly described as a "setting" element, and it follows further that since movement of this "setting" element is required as a prerequisite of any action of the mechanism, a simple form of lock to retain it against movement out of its normal neutral position will efficiently prevent operation of the mechanism. If for instance the brakes be set in "on" position they cannot be released by unauthorized hands if the handle 7 be locked.

Any form of lock may be employed in association with the handle 7 but for purposes of illustration the drawing hereof shows the handle itself to be provided with a keyhole as 48 intended for the insertion of a suitable key to control the operation of a locking tongue 49 which is adapted to be moved into and out of engagement within a suitable opening 50 provided in a stationary member 51 by movement of the key. When the locking tongue 49 is engaged within the opening 50 the handle will be held against swinging in either of its directions.

It should here be mentioned that while the "setting" handle 7 is here shown as having connections for directly mechanically applying frictional resistance to the drums 1 and 2 it is nevertheless apparent that hydraulic, or pneumatic, connections may be provided for this purpose if desired.

As many changes could be made in this construction without departing from the scope of the invention as defined in the following claims, it is intended that all matter contained in the above description or shown in the accompanying drawings, shall be interpreted as illustrative only and not in a limiting sense.

Having thus described my invention, what I claim as new and desire to secure by Letters Patent is:—

1. A power brake comprising a power shaft, a brake rod, selectively operable means by which to move said brake rod by power derived from said shaft, and means manually operable to release the brake rod at will.

2. A power brake comprising a power shaft, a brake rod, a brake shaft interposed between said power shaft and said brake rod, reversing gears connecting said power shaft and said brake shaft, manually operable means to control the action of said reversing gears for thereby causing said brake shaft to rotate either with said power shaft or in a reversed direction to said power shaft, said brake shaft extending longitudinally in the same direction as said brake rod, and screw connection between said brake shaft and said brake rod by which rotation of the brake shaft will cause the brake rod to be moved to brake "setting" or brake releasing position according to the direction of rotation of the brake shaft.

3. A power brake comprising a power shaft, a brake rod, selectively operable means by which to move said brake rod by power derived from said shaft, means automatically operable to limit the movement of the brake rod in at least one direction, and means whereby said brake rod is extensible for the purpose set forth.

4. A power brake comprising a rotatable shaft, means selectively operable to rotate said shaft in either a forward or a reversed direction at will, screw threads provided upon said shaft, an internally threaded sleeve telescoping over said shaft having its threads engaging the threads of the shaft, said sleeve extending longitudinally in the same direction as the shaft, means providing a bearing surrounding the shaft and within which the sleeve is slidably mounted, slot and key means interengaging between the bearing and the sleeve to prevent rotation of the sleeve with respect to said shaft while permitting sliding of the shaft, a brake rod, and means connecting the brake rod with said sleeve.

5. A power brake comprising a rotatable shaft, means selectively operable to rotate said shaft in either a forward or a reversed direction at will, screw threads provided upon said shaft, an internally threaded sleeve telescoping over said shaft having its threads engaging the threads of the shaft, said sleeve extending longitudinally in the same direction as the shaft and continuing beyond the end of the shaft, a bearing within which the sleeve is slidably mounted, means interengaging between the bearing and the sleeve to prevent rotation of the sleeve, a resilient member carried by the sleeve, and a brake rod yieldably connected with the sleeve by engagement with said resilient member.

6. A power brake comprising a rotatable shaft, means selectively operable to rotate said shaft in either a forward or a reversed direction at will, screw threads provided upon said shaft, an internally threaded sleeve telescoping over said shaft having its threads engaging the threads of the shaft, said sleeve extending longitudinally in the same direction as the shaft and continuing beyond the end of the shaft, a bearing within which the sleeve is slidably mounted, means interengaging between the bearing and the sleeve to prevent rotation of the sleeve, a resilient member carried within the projecting portion of the sleeve beyond the end of the shaft, and a brake rod extending into said shaft and being yieldably connected therewith by engagement with said resilient member.

7. In a power brake comprising a rotatably mounted shaft having screw threads thereon, means to rotate the shaft in either a forward or a reversed direction at will, and a brake rod having a threaded part engaging the threads of said shaft whereby the brake rod will be moved to either a brake setting or a brake releasing position according to the direction of rotation of the shaft, the combination therewith of means arranged to be engaged by the brake rod automatically operable to stop rotation of said shaft by movement of the brake rod.

8. In a power brake comprising a rotatably mounted shaft having screw threads thereon, means to rotate the shaft in either a forward or a reversed direction at will, and a brake rod having a threaded part engaging the threads of said shaft whereby the brake rod will be moved to either a brake setting or a brake releasing position according to the direction of rotation of the shaft, the combination therewith of means arranged to be engaged by the brake rod automatically operable to stop rotation of the shaft when the brake rod reaches one extreme of its movement.

9. In a power brake comprising a rotatably mounted shaft having screw threads thereon, means to rotate the shaft in either a forward or a reversed direction at will, and a brake rod having a threaded part engaging the threads of said shaft whereby the brake rod will be moved to either a brake setting or a brake releasing position according to the direction of rotation of the shaft, the combination therewith of means arranged to be engaged by the brake rod automatically operable to stop rotation of the shaft when the brake rod reaches either extreme of its movement.

10. In a power brake comprising a rotatably mounted shaft having screw threads thereon, means to rotate the shaft in either a forward or a reversed direction at will, and a brake rod having a threaded part engaging the threads of said shaft whereby the brake rod will be moved to either a brake setting or a brake releasing position according to the direction of rotation of the shaft, the combination therewith of means automatically operable to stop rotation of said shaft by movement of the brake rod.

11. In a power brake comprising a rotatably mounted shaft having screw threads thereon, means to rotate the shaft in either a forward or a reversed direction at will, and a brake rod having a threaded part engaging the threads of said shaft whereby the brake rod will be moved to either a brake setting or a brake releasing position according to the direction of rotation of the shaft, the combination therewith of means automatically operable to stop rotation of the shaft when the brake rod reaches one extreme of its movement.

12. In a power brake comprising a rotatably mounted shaft having screw threads thereon, means to rotate the shaft in either a forward or a reversed direction at will, and a brake rod having a threaded part engaging the threads of said shaft whereby the brake rod will be moved to either a brake setting or a brake releasing position according to the direction of rotation of the shaft, the combination therewith of means automatically operable to stop rotation of the shaft when the brake rod reaches either extreme of its movement.

13. In a power brake comprising a rotatably mounted shaft having screw threads thereon, means to rotate the shaft in either a forward or a reversed direction at will, and a brake rod having a threaded part engaging the threads of said shaft whereby the brake rod will be moved to either a brake setting or a brake releasing position according to the direction of rotation of the shaft, the combination therewith of means automatically operable to stop rotation of said shaft by movement of the brake rod, and means manually operable to release the brake rod at will.

14. A power brake comprising a rotatably mounted shaft, an exteriorally threaded sleeve carried by said shaft, means to rotate the shaft in either a forward or a reversed direction at will, means interengaging between the shaft and sleeve to cause rotation of the sleeve with the shaft while permitting sliding movement of the sleeve longitudinally of the shaft, a brake rod having a threaded part engaging the threads of said sleeve to control the brake rod, means to retain the sleeve against sliding movement upon the shaft, and manually operable means to release said retaining means at will.

15. In a power brake comprising a rotatably mounted shaft having screw threads thereon, a brake rod having a threaded part engaging the threads of said shaft, means comprising a part extending to a distance from said shaft manually selectively operable to rotate the shaft to effect rotation of the shaft in either a forward or a reversed direction at will, and mechanism whereby said extending part is selectively operable also to effect release of the brake rod at will.

In witness whereof I affix my signature.

DE WITT C. CONKLING.